United States Defensive Publication [19] (H) [11] T998,010

Gorin [43] Sep. 2, 1980

[54] PROCESS FOR REMOVAL OF SULFUR DIOXIDE FROM GASES

[75] Inventor: Everett Gorin, San Rafael, Calif.

[73] Assignee: Continental Oil Company, Stamford, Conn.

[21] Appl. No.: 95,742

[22] Filed: Nov. 19, 1979

Related U.S. Application Data

[63] Continuation of Ser. No. 966,685, Dec. 5, 1978, abandoned.

[51] Int. Cl.[3] ..... C01B 17/00

[52] U.S. Cl. ..... 423/242

[57] ABSTRACT

An improvement is provided in the regeneration system of aqueous regenerative processes for the removal of $SO_2$ from $SO_2$-containing gas streams which have a scrubbing system containing (1) a scrubbing zone through which a recirculating stream of sodium, potassium or ammonium thiosulfate solution continuously passes as a vehicle for the $SO_2$ absorbent—sodium, potassium, or ammonium carbonate—under conditions favorable to the formation of sulfite by the reaction of carbonate and $SO_2$ and (2) a thiosulfate generation zone in which the sulfite is converted by sulfide to thiosulfate. The improvement comprises converting in a regenerating system, the net make of thiosulfate to sulfide and carbonate by converting one portion of the thiosulfate to formate and the reacting the other portion with said formate.

4 Claims, 1 Sheet Drawing,

19 Pages Specification

The file of this unexamined application may be inspected and copies thereof may be purchased (849 O.G. 1221, Apr. 9, 1968).

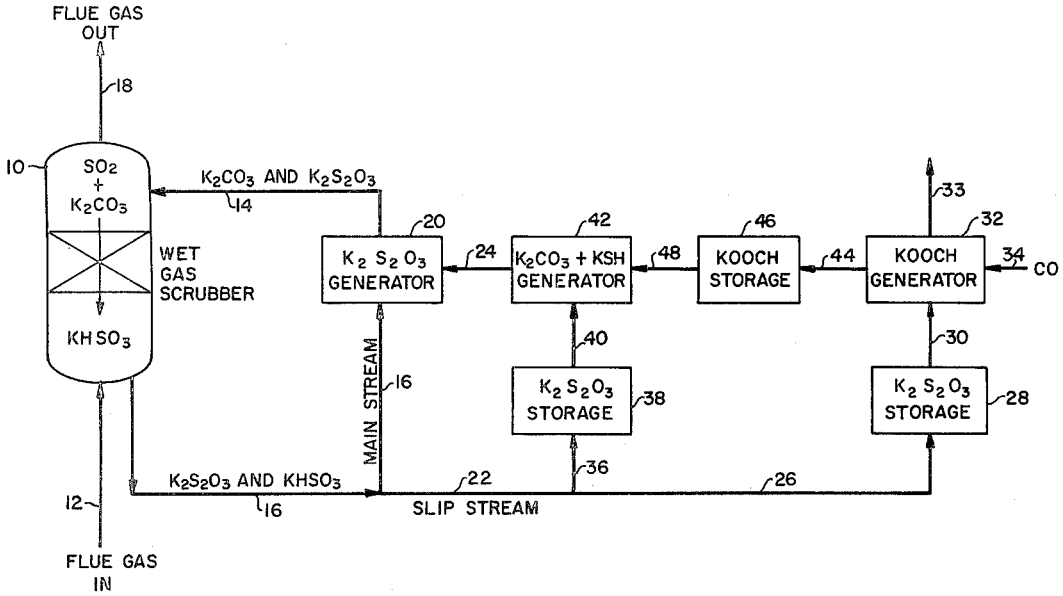

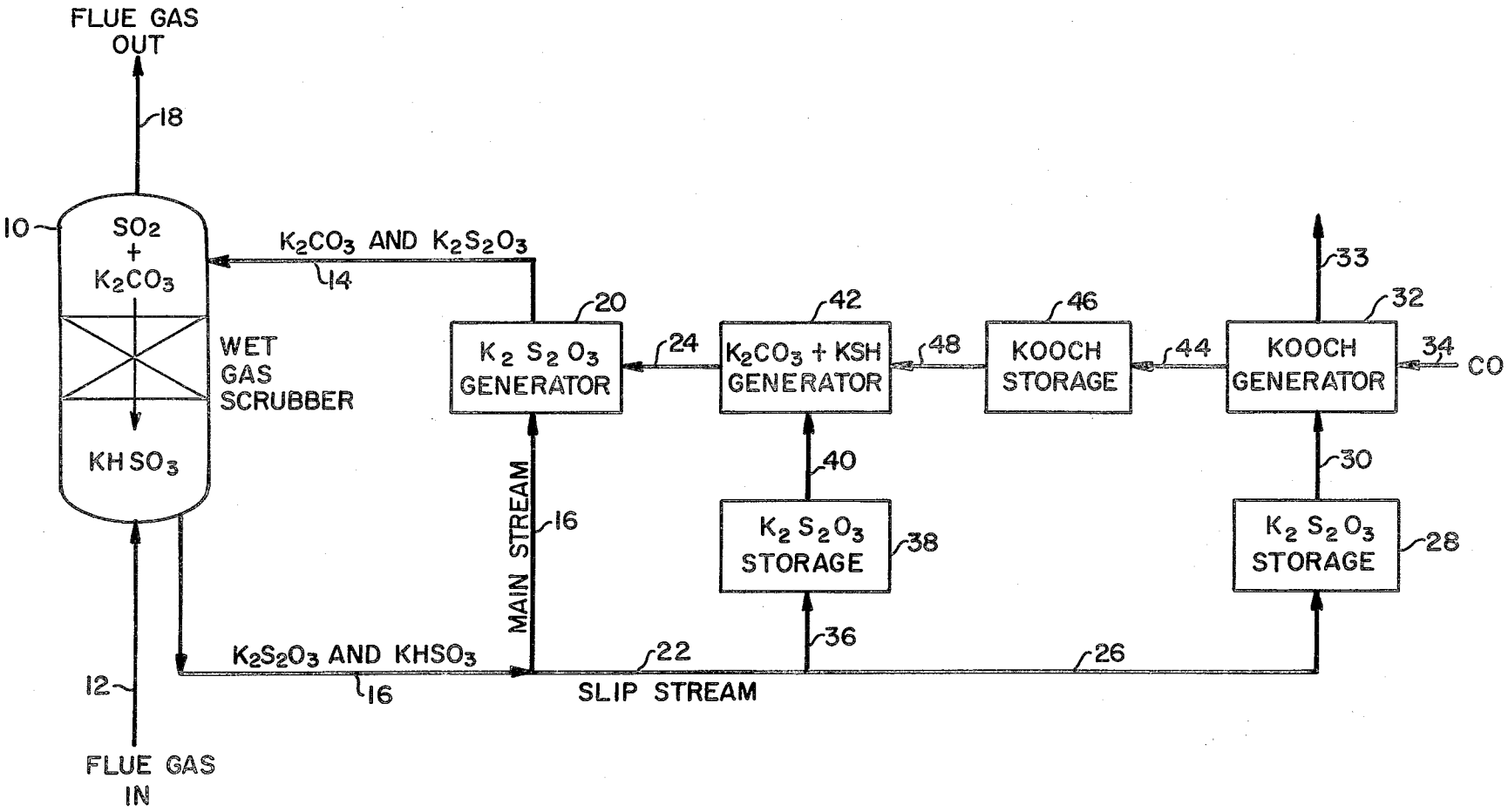
FLUE GAS OUT
18
10
SO2 + K2CO3
WET GAS SCRUBBER
KHSO3
12
FLUE GAS IN
K2CO3 AND K2S2O3
14
K2S2O3 AND KHSO3
16
K2S2O3 GENERATOR
20
24
MAIN STREAM
16
K2CO3 + KSH GENERATOR
42
48
40
K2S2O3 STORAGE
38
36
SLIP STREAM
22
26
KOOCH STORAGE
46
44
KOOCH GENERATOR
32
33
34
CO
30
K2S2O3 STORAGE
28